United States Patent
Chung et al.

(10) Patent No.: US 8,142,036 B2
(45) Date of Patent: Mar. 27, 2012

(54) KEYPAD DEVICE WITH LIGHT SOURCE AND REFLECTOR

(75) Inventors: Muh Fong Chung, Bukit Jambul (MY);
Sian Tatt Lee, Georgetown (MY);
Choon Guan Ko, Sungai Dua (MY);
Fook Chuin Ng, Butterworth (MY)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 173 days.

(21) Appl. No.: 12/403,362

(22) Filed: Mar. 12, 2009

(65) Prior Publication Data

US 2010/0232098 A1    Sep. 16, 2010

(51) Int. Cl.
*G01D 11/28*    (2006.01)

(52) U.S. Cl. ............. 362/26; 362/30; 362/612; 200/314

(58) Field of Classification Search .......... 200/310–314;
362/23–24, 26–27, 29–30, 600
See application file for complete search history.

(56) References Cited

U.S. PATENT DOCUMENTS

| | | | |
|---|---|---|---|
| 5,746,493 A * | 5/1998 | Jonsson et al. ................. | 362/602 |
| 6,158,867 A * | 12/2000 | Parker et al. ..................... | 362/29 |
| 6,776,497 B1 | 8/2004 | Huppi et al. | |
| 6,861,600 B1 | 3/2005 | Schulz et al. | |
| 7,232,969 B1 | 6/2007 | Hsu et al. | |
| 2007/0175744 A1 | 8/2007 | Lee et al. | |
| 2008/0053800 A1 | 3/2008 | Hoyle | |
| 2008/0175022 A1* | 7/2008 | Sugiura et al. ................. | 362/609 |
| 2008/0211776 A1* | 9/2008 | Lee ............................... | 345/169 |

* cited by examiner

*Primary Examiner* — Jason Moon Han

(57) ABSTRACT

A device is disclosed having a keypad and an adjacent light guide with at least one light source. At least one reflector is provided, having at least an area thereof adjacent to the light source. At least a portion of the reflector is located either between the light source and the keypad or between the light guide and the keypad.

19 Claims, 7 Drawing Sheets

KEYPAD DEVICE WITH LIGHT SOURCE AND REFLECTOR

BACKGROUND

User input interfaces are used in many different types of electronic devices and generally allow human users to enter data and/or commands into an electronic format. A keypad is a type of user input interface in which one or more keys or buttons are pressed to enter the data and/or commands. In a typical keypad, the keys are movably mounted such that application of a force to a key causes the key to move relative to another portion of the keypad. Movement of the key can then be sensed electrically, for example, by causing electrical continuity to occur within a circuit. The force that moves the keys on a keypad is typically provided by the human user's finger.

Keypads are used in many other applications, in addition to cellular telephone devices. Examples of such other applications that typically utilize keypads include electronic dictionaries, personal digital assistants (PDAs), handheld game consoles, security input pads for allowing selective entry into a facility or area and remote control devices for video and audio appliances.

A keypad may include multiple keys, each corresponding to a different command and/or data input selection. An example of a keypad with multiple keys is the type of keypad commonly used in cellular telephone devices. In a cellular telephone device, the keypad may, for example, include individual keys for each of the digits 0 through 9 to allow telephone numbers to be entered into the cellular telephone device. To help a human user interface with an electronic device via a keypad, the keys on a keypad typically include icons to identify what command or data input selection each key represents. In the example of a cellular telephone device keypad, as discussed above, the keys for each of the digits 0 through 9 may each include an appropriate icon indicating the digit that each key represents (the key that corresponds to 0 would include the icon "0", and so on). Keys often may serve different functions or data input selections when, for example, the device is in different modes of operation.

In order to facilitate use of a keypad in low ambient light situations, many keypads include a backlighting feature in which one or more light sources illuminates the keys from beneath. This backlighting generally causes each key to be lighted so that it can readily be found and identified. In many cases, the keypad icons are provided as relatively transparent features so that the icons, themselves, will be illuminated, thus further facilitating use of the keypad in low ambient light situations.

Electronic devices with backlit keypads typically include, for example, a keypad assembly having a keypad, a switchboard below the keypad and a light guide between the keypad and the switchboard. A number of light emitting diodes (LEDs) are normally located adjacent the light guide to supply light into the light guide. The keypad is commonly constructed as an elastic pad plate with a plurality of key buttons formed therein. As discussed previously, each of the key buttons may include one or more icons or characters printed on the upper surface thereof. Each of the key buttons generally also includes one or more protrusions (or actuators) formed on its lower surface.

In many cases, the switchboard takes the form of a printed circuit board with a plurality of switches formed on the upper surface thereof facing the keypad. Each of the switches may, for example, include a conductive contact member and a conductive dome covering the contact member. When a user presses one of the key buttons, the portion of the keypad positioned beneath the pressed key button deforms towards the switch board. As a result, one of the protrusions corresponding to the deformed portion presses the corresponding conductive dome on the switchboard, thus providing an electrical contact with the corresponding contact member.

To enhance optimum usability of keypad devices in low ambient light situations, it is desirable to provide keyboard backlighting that is both sufficient in intensity and relatively uniform in distribution across the illuminated keys.

SUMMARY

Disclosed herein is a device that may include a housing defining an interior of the device within the housing and an exterior of the device outside of the housing. A keypad is provided having a first surface facing the exterior of the device, and an oppositely-disposed second surface facing the interior of the device. The device may further include a light guide having a light guide first surface positioned adjacent the keypad second surface, an oppositely-disposed light guide second surface and at least one light guide edge surface connecting the light guide first surface and the light guide second surface. A light supply includes a first light source positioned adjacent the light guide edge surface. At least one first reflector may have a first reflector area adjacent the first light source. The first reflector area may have a first reflector portion located between the light source and the keypad.

A device may include a housing defining an interior of the device within the housing and an exterior of the device outside of the housing. A keypad is provided having a first surface facing the exterior of the device, and an oppositely-disposed second surface facing the interior of the device. The device may further include a light guide having a light guide first surface positioned adjacent the keypad second surface, an oppositely-disposed light guide second surface and at least one light guide edge surface connecting the light guide first surface and the light guide second surface. A light supply includes a first light source positioned adjacent the light guide edge surface. At least one first reflector may have a first reflector area adjacent the first light source. The first reflector area may have a first reflector portion located between the light guide and the keypad.

DETAILED DESCRIPTION

Figure 1:
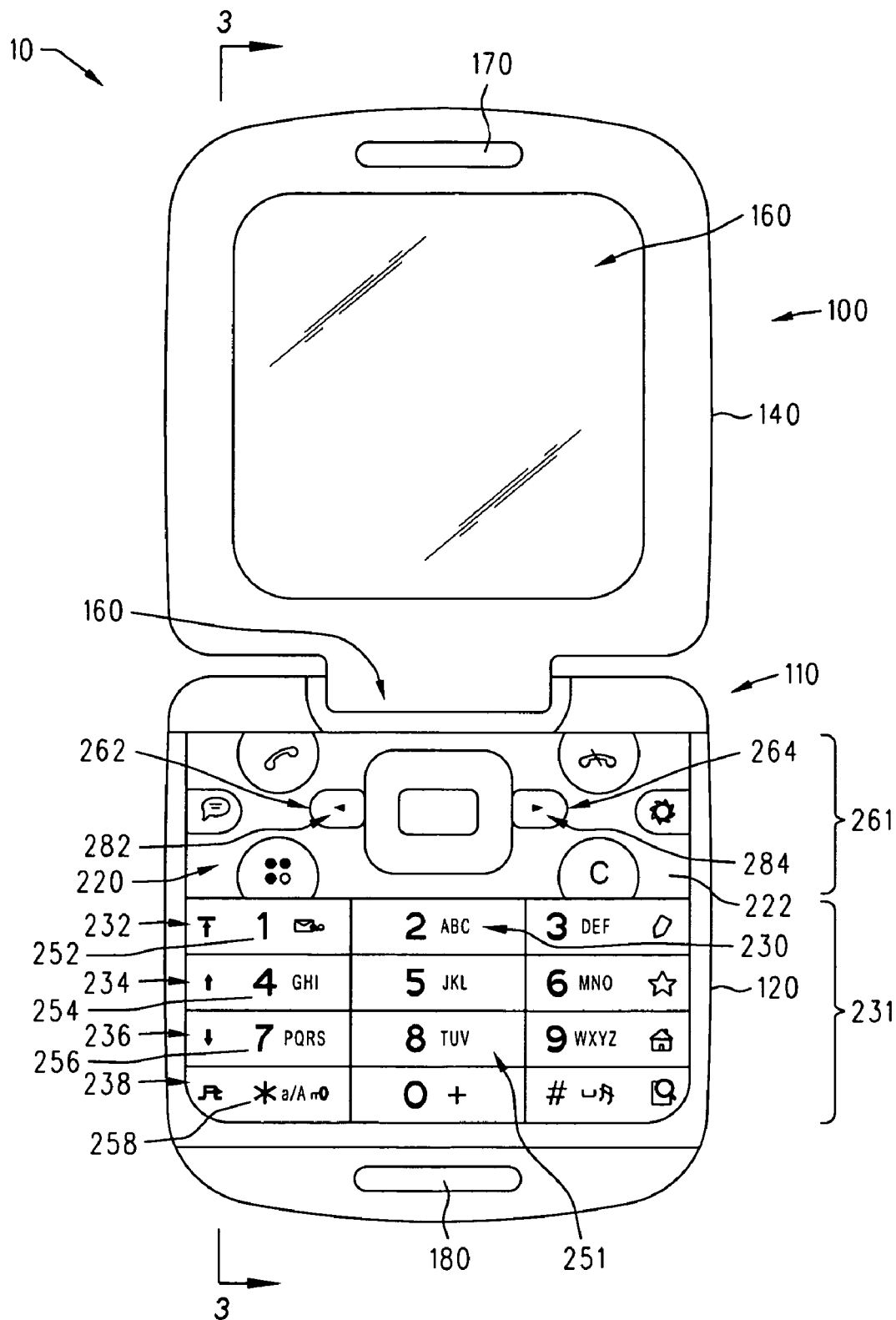
FIG. 1 is a top plan view of one exemplary embodiment of an electronic device in the form of an exemplary cellular telephone.

FIG. 1 shows one exemplary embodiment of an electronic device 10, illustrated in the form of a cellular telephone device. It is to be understood that electronic device 10 is depicted in the specific form of cellular telephone device 100 for exemplary purposes only in order to facilitate the description herein of the electronic device 10. Although illustrated and described herein in the specific form of a cellular telephone device, it is to be understood that the electronic device 10 may, alternatively, be any other type of electronic device incorporating a user interface keypad for the purpose of allowing human users to convey data and/or commands to the electronic device in an electronic format. Examples of such other types of electronic devices include, without limitation, electronic dictionaries, personal digital assistants (PDAs), handheld game consoles, security input pads for allowing selective entry into a facility or area and remote control devices for video and audio appliances.

With further reference to FIG. 1, cellular telephone device 100 may include a body 110 including a base portion 120 (which may also be referred to herein as a housing) and a cover portion 140. The cover portion 140 may be pivotally attached to the base portion 120 by a hinge connection 150 in a conventional manner such that the cover portion 140 may be pivoted between a closed position, in which the cover portion 140 covers the base portion 120, and an open position (as shown in FIG. 1) in which the cover portion 140 does not cover the base portion 120. It is noted that, although cellular telephone device 100 is depicted herein as a "flip-type" phone (i.e., one that has a cover portion 140 hingedly attached to a base portion 120), this depiction is presented is for exemplary purposes only. Cellular telephone device 100 could, alternatively be any type of telephone that includes a keypad.

As illustrated in FIG. 1, cellular telephone device 100 may include, for example, conventional features such as a display screen 160 and a speaker 170 formed on the cover portion 140. The display screen 160 may, for example, be a Liquid Crystal Display Module (LCM). The display screen 160 may, for example, be predominantly disposed inside the cover portion 140 with the display area of the display screen 160 facing outwardly from the cover portion 140 such that the display area is visible to a user when the cover portion 140 is pivoted to the open position, as illustrated in FIG. 1. The display screen 160 is provided to display, for example, images, patterns and text to the user relating to various functions (e.g., menu display and selection options and incoming call information) during normal operation of the cellular telephone device 100. The speaker 170 is provided to supply audio output to a user of the cellular telephone device 100 and is positioned such that it will be more or less adjacent to an ear of the user when the cellular telephone device 100 is being used with the cover portion 140 in the open position illustrated in FIG. 1.

Cellular telephone device 100 may further include, for example, additional features such as a microphone 180 and a keypad 220 formed in the base portion 120, as illustrated in FIG. 1. The microphone 180 is provided to acquire audio input from a user of the cellular telephone device 100 and is positioned such that it will be more or less adjacent to the mouth of the user when the cellular telephone device 100 is being used with the cover portion 140 in the open position illustrated in FIG. 1. It is noted that, although not specifically described herein, cellular telephone device 100 may also include other features and subsystems (e.g., a power supply such as a battery, various circuit boards and other electronics and one or more antennas) as will readily be understood by one of ordinary skill in the art.

Figure 2:
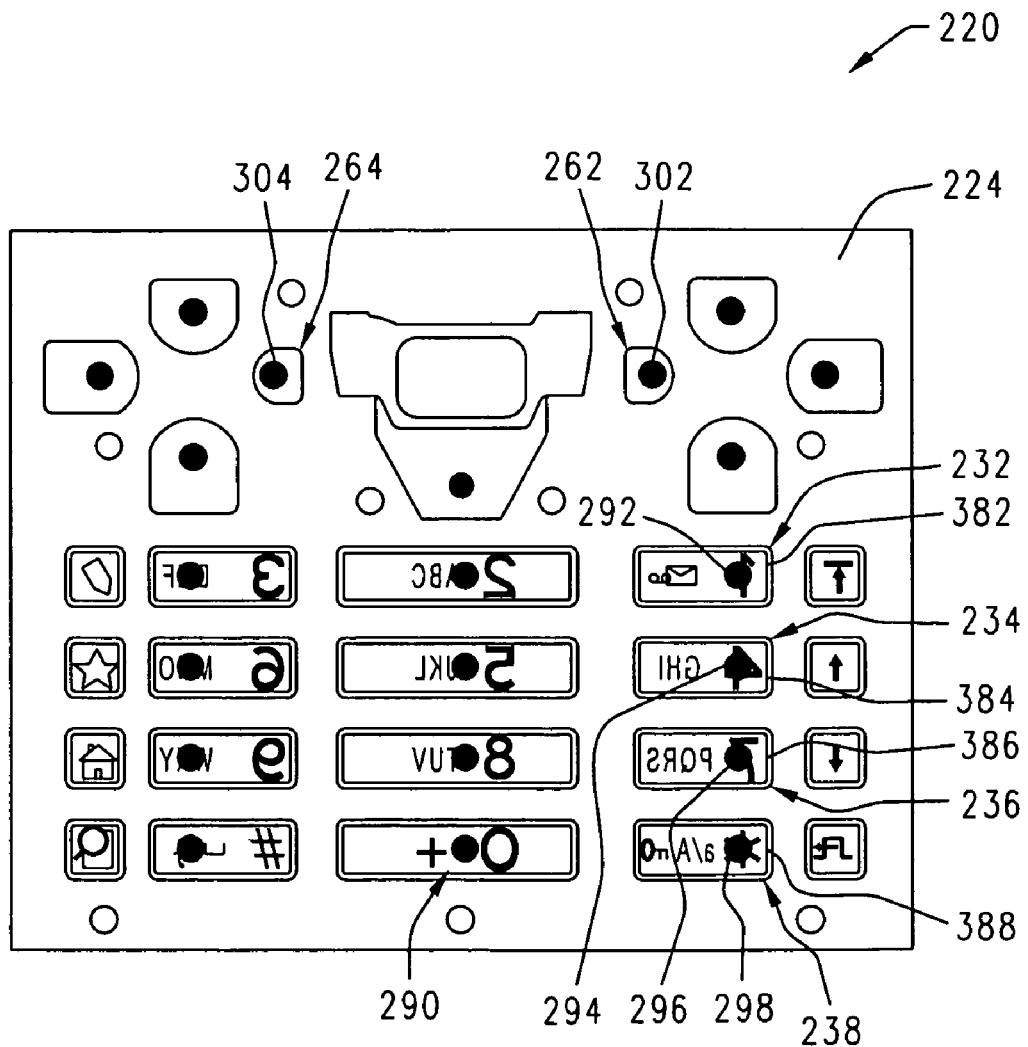
FIG. 2 is a bottom plan view of an exemplary keypad that may be used in the cellular telephone device shown in FIG. 1.

The keypad 220 includes an upper surface 222 that faces the user when the cellular telephone device is in the open position shown in FIG. 1 and an oppositely-disposed lower surface 224, FIG. 2, that faces the interior of the base portion 120. Lower surface 224 may, for example, have a generally white color. With reference, again, to FIG. 1, the keypad 220 functions as a user input interface and generally includes a plurality of key buttons 230 formed in the upper surface 222 of the keypad 220. Each of the key buttons 230 may be movably mounted such that application of a force to a key button causes the key button to move relative to another portion of the keypad. As will be explained in further detail herein, relative movement of the key button in this manner can be sensed electrically, for example, by causing electrical continuity to be established within a circuit contained inside the body 110 of the cellular telephone device 100. The force causing movement of the key buttons 230 is typically provided by a finger or thumb of the user of the cellular telephone device 100 such that the user can selectively enter data and/or commands during operation of the cellular telephone device 100.

As generally shown, for example, in FIG. 1, the key buttons 230 may include, for example, a first set of key buttons 231 (such as the individual key buttons 232 and 234, 236, 238 and a second set of key buttons 261 (such as the individual key buttons 262, 264) located above the first set of buttons 231 (as viewed in FIG. 1). Each of the key buttons 230 on the keypad 220 corresponds to a different command and/or data input selection. Additionally, at least some of the key buttons 230 may correspond to several different functions, depending on the mode in which the keypad 220 is being used.

In order to assist the user when interfacing with the cellular telephone device 100, the key buttons 230 on the keypad 220 may include icons or symbols on their upper surfaces to identify what command(s) or data input selection(s) each key button represents. Specifically, the first set of key buttons 231 may include a first set of icons 251 (the individual key buttons 232, 234, 236, 238 of the first set of key buttons, for example, may include the icons 252, 254, 256, 258, respectively). The second set of key buttons 261 may include a second set of icons 281 (the individual key buttons 262, 264 of the second set of key buttons 261, for example, may include the icons 282, 284, respectively).

FIG. 2 illustrates the keypad 220 viewed from its lower surface 224 . With reference to FIG. 2, the key buttons 230 may include projections 290 extending therefrom, such as the individual projections 292, 294, 296, 298, 302 and 304 shown extending from the key buttons 232, 234, 236, 238, 262 and 264, respectively. The projections 290 may, for example, extend from the key buttons 230 in a generally outward direction relative to the page in the view of FIG. 2. The projections 290 may be provided in order to facilitate sensing of a key button press, as will be explained in further detail herein.

In order to facilitate use of the keypad 220 in low ambient light situations, the keypad may be provided with a backlight feature in which one or more light sources illuminate the icons of the keypad 220 from beneath. This backlighting generally causes each key button icon to be lighted so that it can readily be found and actuated by the user.

Figure 3:
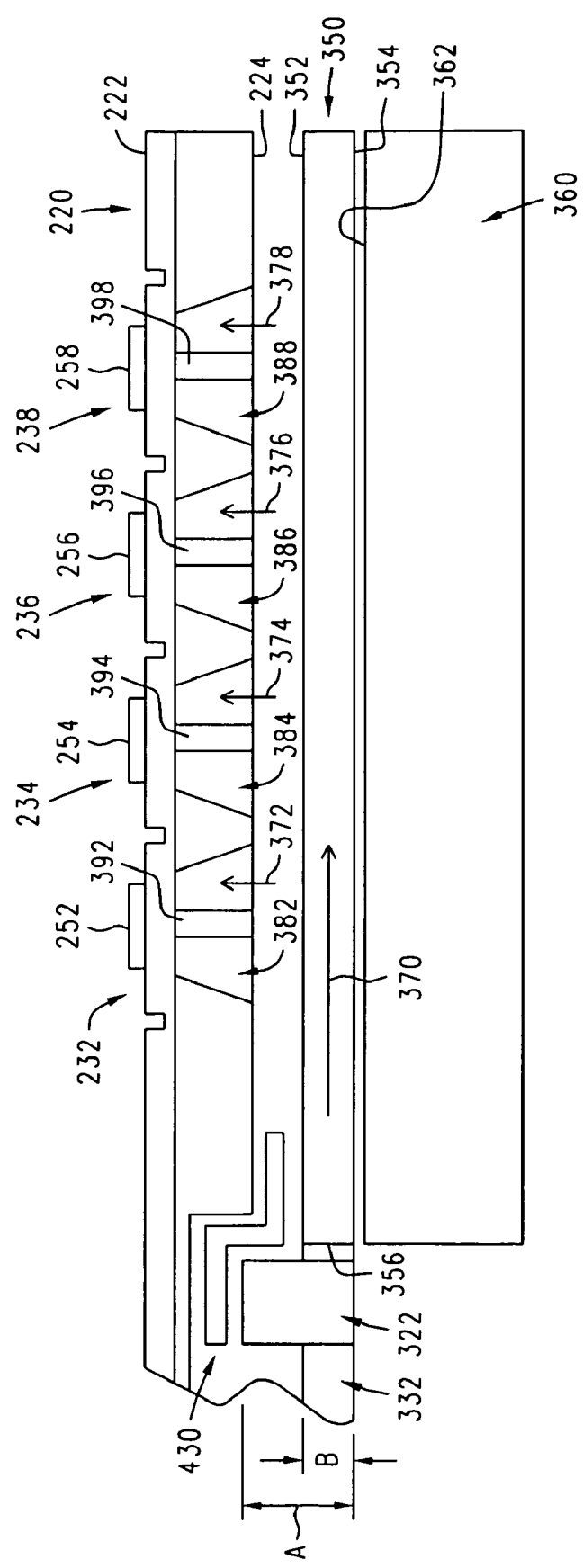
FIG. 3 is an exemplary schematic partial cross-sectional view taken generally along the line 3-3 in FIG. 1.

In order to provide for the backlight feature discussed above, a light guide 350 may be positioned below the lower surface 224 of the keypad 220, as shown in FIG. 3. In general terms, the light guide may distribute light across the first set of key button icons 251 (e.g., the individual key button icons 252, 254, 256, 258 shown in FIG. 3) from one or more light sources. The light sources may, for example, be light emitting diode (LED) light sources. Each of the light sources, for example the LED light source 322 shown in FIG. 3, may be positioned such that a portion of the light source overlies a side edge 356 of the light guide 350. In this manner, light from the light source can enter the light guide 350 through the side surface 356 of the light guide 350 and be distributed along the light guide as schematically indicated in FIG. 3 by the arrow 370. Portions of the distributed light may thereafter exit the light guide to provide light beneath the icons 251, as schematically illustrated by the arrows 372, 374, 376, 378 in relation to the icons 252, 254, 256, 258, respectively. The light guide 350 may be provided with features (e.g., selectively located reflective patterns), as is well-known in the art, to cause light to leave the light guide at specific locations, e.g., beneath the icon areas.

To facilitate the backlighting, the icons may be formed from a relatively transparent material so that the light exiting the light guide 350 (as illustrated, for example, by the arrows 372, 374, 376, 378) will pass through the icons causing the icons to be readily visible, from the upper surface 222 of the keypad 220, by a user of the device. The lower surface 224 of the keypad 220 may be provided with beveled indentations in the icon areas (e.g., the beveled indentations 382, 384, 386, 388 corresponding to the icons 252, 254, 256, 258, respectively) to allow light from the light guide 350 to reach the icons in a relatively unimpeded fashion.

With further reference to FIG. 3, a switchboard 360 may be provided beneath the light guide 350 in a conventional manner. Switchboard 360 may, for example, take the form of a printed circuit board with a plurality of switches (not shown) formed on the upper surface 362 thereof facing the keypad light guide 350 and keypad 220. Each of the switches may, for example, include a conductive contact member and a conductive dome covering the contact member. When a user presses one of the key buttons, the projections extending from the key buttons (e.g., the projections 392, 394, 396, 398) are urged towards and into contact with the light guide 350 causing the contacted area of the light guide to deform downwardly, pressing the corresponding conductive dome on the switchboard 360 and thus providing an electrical contact with the corresponding contact member.

Figure 4:
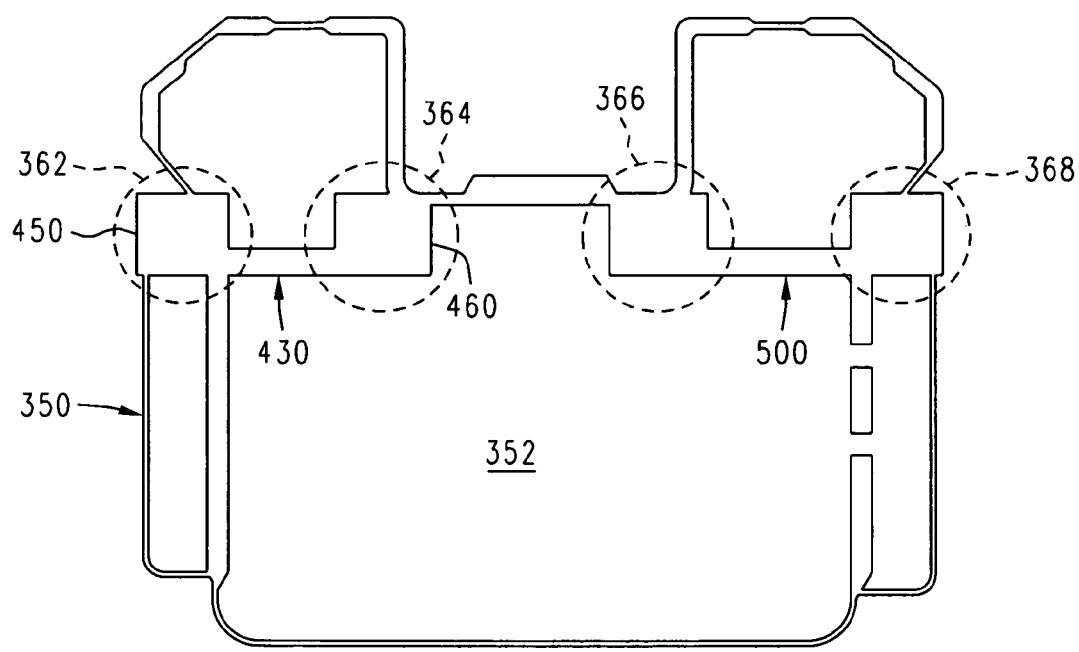
FIG. 4 is a top plan view of an exemplary light guide assembly that may be used in the cellular telephone device of FIG. 1.
Figure 5:
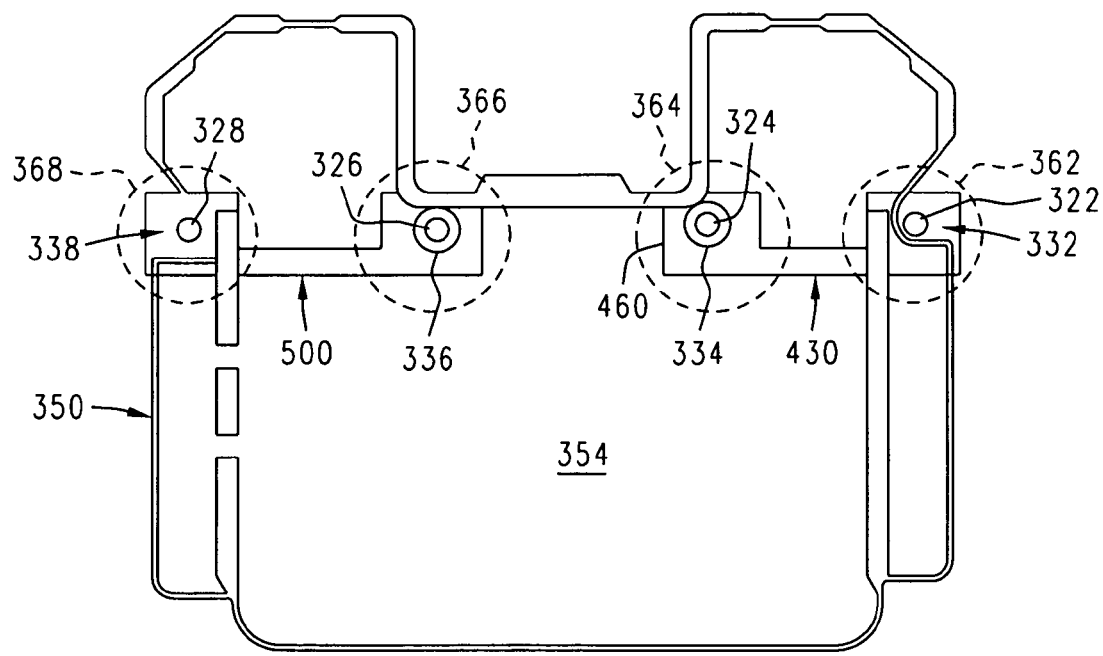
FIG. 5 is a bottom plan view of the exemplary light guide assembly illustrated in FIG. 4.

FIG. 4 illustrates the light guide 350 from the upper surface 352 thereof, while FIG. 5 illustrates the light guide from the lower surface 354. With reference to FIGS. 4 and 5, the light guide 350 may include a plurality of light areas, such as the light areas 362, 364, 366 and 368. Each of the light areas may include a light source 322, 324, 326 and 328, respectively, which may be, for example, an LED light source. To facilitate mounting of the light sources in a manner that allows light to enter a side edge 356, FIG. 3, of the light guide (as discussed above), light guide 350 may be provided with apertures 334, 336 for the light sources 324, 326, respectively and notches 332, 338 for the light sources 322, 328, respectively. With reference again to FIG. 3, each of the light sources may have a height "A" that is greater than the height "B" of the light guide 350.

As discussed above, it is desirable to provide keyboard backlighting that is both sufficient in intensity and relatively uniform in distribution across the illuminated key buttons and icons. It has been discovered, however, that "hot spots" (i.e., areas of higher illumination) tend to develop in areas that are located near the light sources. The formation of such hot spots may cause, for example, the icon 252 (e.g., FIGS. 1 and 3), which is relatively closer to the light source 322, to be noticeably brighter than the icon 258, which is relatively further from the light source 322.

With reference to FIG. 3, it is believed that one reason for such hot spots is that a portion of the light emitted by the light source 322 can directly enter the keypad 220 and be transmitted therethrough to locations relatively near the light source 322. This problem appears to be aggravated by the fact that the light source 322 may have a height "A" that is greater than the height "B" of the light guide 350, as discussed above, such that a portion of the light source extends beyond the upper surface 352 of the light guide 350. Another reason discovered for the formation of hot spots is that some of the light from the light source 322 tends to reflect between the keypad lower surface 224 (which, as discussed above, often has a reflective white color) and the upper surface 352 of the light guide 350 until it reaches the icons closest to the light source 322 (e.g., the icon 252, FIG. 3).

Figure 6:
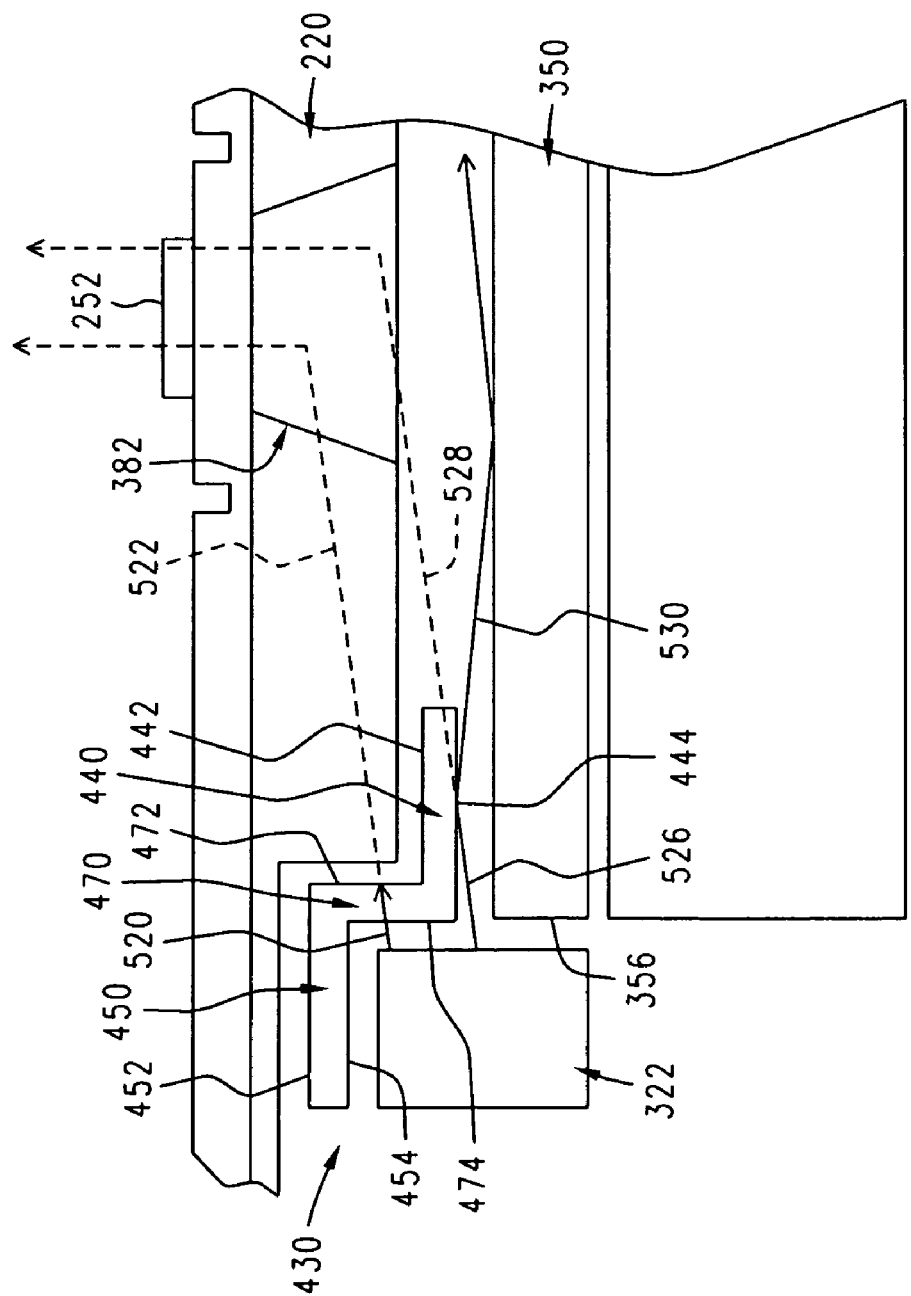
FIG. 6 is an enlarged portion of the exemplary schematic partial cross-sectional view of FIG. 3.
Figure 7:
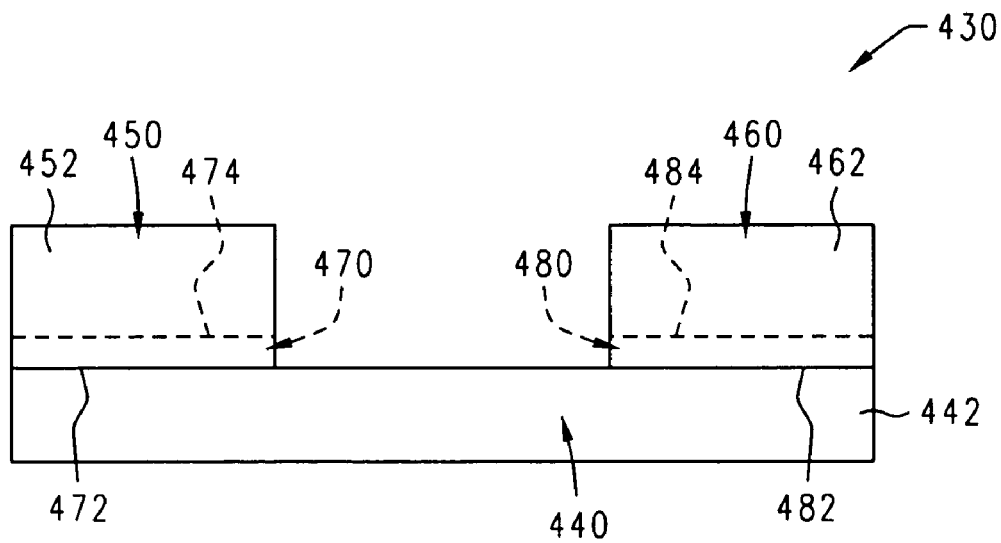
FIG. 7 is a top plan view of an exemplary reflector that may be used in the cellular telephone device of FIG. 1.
Figure 8:
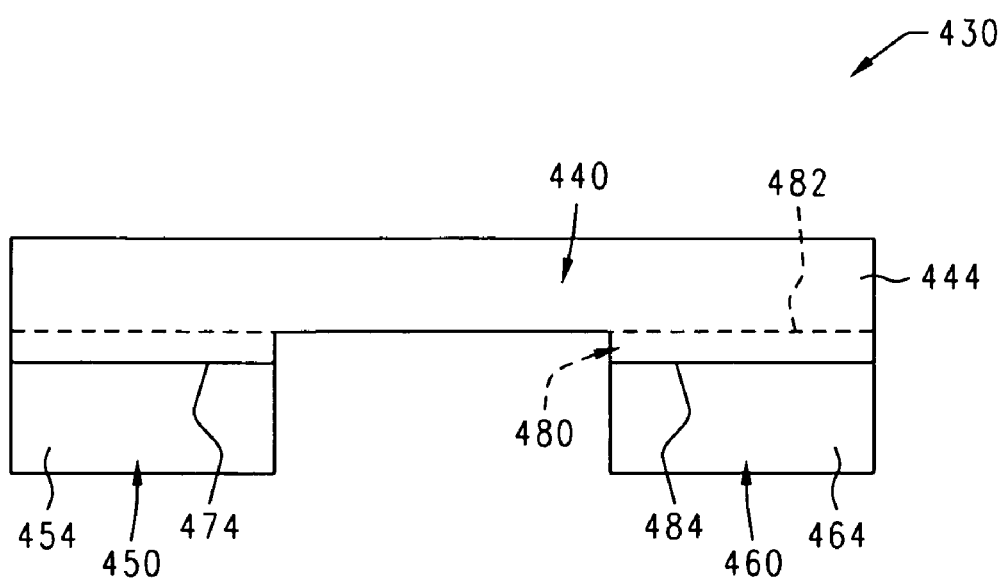
FIG. 8 is a bottom plan view of the exemplary reflector illustrated in FIG. 7.

In order to reduce the hotspot problem discussed above, a reflector 430 may be provided adjacent the light source 322, as generally indicated in FIG. 3. FIGS. 6-8 illustrate the reflector 430 in greater detail. With reference to FIGS. 6-8, reflector 430 may include a bottom flange portion 440 having an upper surface 442 and an oppositely-disposed lower surface 444, a first top flange portion 450 having an upper surface 452 and an oppositely-disposed lower surface 454 and a second top flange portion 460 having an upper surface 462 and an oppositely-disposed lower surface 464.

The first top flange portion 450 may be connected to the bottom flange portion 440 by a wall portion 470 which may extend substantially perpendicularly from both the first top flange portion 450 and the bottom flange portion 440. Wall portion 470 may have a first surface 472 and an oppositely-disposed second surface 474. Wall portion first surface 472 may be contiguous with the first top flange portion upper surface 452 and the bottom flange portion upper surface 442. Wall portion second surface 474 may be contiguous with the first top flange portion lower surface 454 and the bottom flange portion lower surface 444.

The second top flange portion 460 may be connected to the bottom flange portion 440 by a wall portion 480 which may extend substantially perpendicularly from both the second top flange portion 460 and the bottom flange portion 440. Wall portion 480 may have a first surface 482 and an oppositely-disposed second surface 484. Wall portion first surface 482 may be contiguous with the second top flange portion upper surface 462 and the bottom flange portion upper surface 442. Wall portion second surface 484 may be contiguous with the second top flange portion lower surface 464 and the bottom flange portion lower surface 444.

With reference to FIGS. 4 and 5, it can be seen that the reflector 430 may be positioned with respect to the light guide 350 such that the reflector first top flange portion 450 is positioned above the light source 322 in the light area 362 and the reflector second top flange portion 460 is positioned above the light source 324 in the light area 364. With reference to FIG. 6, it can be seen, for example, that the reflector 430 is positioned such that the reflector first top flange portion 450 is generally located between the light source 322 and the keypad 220 and the reflector bottom portion 440 is located between the light guide 350 and the keypad 220. The reflector second top flange portion 460 may be positioned in a similar manner with respect to the light source 324, FIG. 5.

The reflector 430 may, for example, be formed as a one-piece structure from a plastic material. The plastic material may, for example, be of a white color. The surfaces of the reflector facing away from the light sources (e.g., the surfaces 442, 452, 472, FIG. 6) may be printed or coated with a black ink or dye such that the surfaces have a black color. The opposite surfaces of the reflector (e.g., the surfaces 444, 454, 474, FIG. 6) may display a white color due to the color of the plastic material from which the reflector is formed.

With further reference to FIGS. 4 and 5, a second reflector 500 may be provided which is substantially identical to the reflector 430 described above. The second reflector 500 may be positioned with respect to the light sources 326, 328 in a manner similar to that described above with respect to the reflector 430.

It has been discovered that the reflectors 430, 500 described above significantly reduce the previously-described hot spot problem and cause more light to be distributed to icons that are relatively further from the light sources. With reference to FIG. 6, light leaving the light source 322 for example, along a path 520 would normally follow the dashed line route 522, entering the key pad 220 and eventually exiting through the icon closest to the light source (i.e., the icon 252, in this case). With the reflector 430 in place, however, the light leaving the light source 322 along the path 520 will be intercepted by the reflector wall portion 470 and then be reflected by the white surface 474 and/or absorbed by the black surface 472 of the reflector (depending upon the angle of incidence). Accordingly, the reflector prevents unwanted extra light from reaching the area of the icon 252 via the path 522. As discussed above, the surfaces 442, 452 and 472 may be printed or coated with black ink or the like to facilitate light absorption and the surfaces 444, 454 and 474 may be of a white color in order to facilitate light reflection.

With further reference to FIG. 6, light leaving the light source 322 for example, along a route 526 would normally follow the dashed line route 528, entering the keypad beveled area closest to the light source (i.e., beveled area 382 in this case) and then exiting through the associated icon (i.e., the icon 252, in this case). With the reflector 430 in place, however, light leaving the light source 322 along the path 526 will be intercepted by the reflector first bottom flange portion 440 and will be reflected by the flange portion surface 444 along the alternative path 530. As can be seen, the alternative path 530 may be reflected again by the upper surface of the light guide 350 to locations beyond the area of the closest icon (i.e., the icon 252 in this example). Thus, not only does the reflector prevent unwanted extra light from reaching the area of the icon 252 via the path 526, it also causes additional light to reach more distant icons (e.g., the icons 254, 256, 258, FIG. 3) where greater illumination is desired.

As can be appreciated from the above, the reflectors described herein reduce hot spots on backlit keypads and also cause additional light to reach keypad icons that are relatively more distant from the light source(s). This, in turn, results in greater uniformity of keypad illumination.

While illustrative and presently preferred embodiments of the invention have been described in detail herein, it is to be understood that the inventive concepts may be otherwise variously embodied and employed and that the appended claims are intended to be construed to include such variations except insofar as limited by the prior art.

What is claimed is:

1. A device comprising:
a housing defining an interior of the device within the housing and an exterior of the device outside of the housing;
a keypad comprising a first surface facing the exterior of the device, and an oppositely-disposed second surface facing the interior of said device;
a first light source having a top surface and a side surface;
a second light source having a top surface and a side surface;
a light guide comprising a plurality of light areas including a first light area and a second light area, the first light source disposed adjacent to the first light area and the second light source disposed adjacent to the second light area, wherein the light guide comprises a light guide first surface positioned adjacent the keypad second surface, an oppositely-disposed light guide second surface and at least one light guide edge surface connecting the light guide first surface and the light guide second surface, wherein the side surface of the first light source is positioned adjacent to the at least one light guide edge surface, and wherein the side surface of the second light source is positioned adjacent to the at least one light guide edge surface;
and
at least one reflector having a stepped portion that facilitates reflection and absorption of light, the at least one reflector comprising a first
top flange portion, a second top flange portion, and a bottom flange portion connecting the first top flange portion and the second top flange portion, wherein the first top flange portion is located between the top surface of the first light source and the second surface of the keypad, and wherein the second top flange portion is located between the top surface of the second light source and the second surface of the keypad.

2. The device of claim 1 and further wherein:
the bottom flange portion is located between the first surface of the light guide and the second surface of the keypad.

3. The device of claim 2 and further wherein:
the first top flange portion comprises a substantially planar first surface;
the bottom flange portion comprises a substantially planar second surface; and
the substantially planar first surface of the first top flange portion is substantially parallel to the substantially planar second surface of the bottom flange portion.

4. The device of claim 3 and further wherein:
the first top flange portion is connected to the bottom flange portion by a wall portion;
the wall portion comprises a substantially planar third surface; and
the substantially planar third surface of the wall portion is transverse to the substantially planar first surface of the first top flange portion and the substantially planar second surface of the bottom flange portion.

5. The device of claim 4 and further wherein:
the substantially planar third surface of the wall portion is perpendicular to the substantially planar first surface of the first top flange portion and the substantially planar second surface of the bottom flange portion.

6. The device of claim 1 and further wherein:
the at least one light guide edge surface defines a distance extending between the light guide first surface and the light guide second surface;
the first light source has a height; and
the height of the first light source is greater than the distance extending between the light guide first surface and the light guide second surface.

7. The device of claim 1 and further wherein:
the first top flange portion has a first surface facing the first light source and an oppositely-disposed second surface facing the keypad;
the at least one reflector is formed as a one-piece structure from a white plastic material;
the first surface of the first top flange portion has a white color; and
the second surface of the first top flange portion has a black color.

8. A device comprising:
a housing defining an interior of the device within the housing and an exterior of the device outside of the housing;
a keypad comprising a first surface facing the exterior of said device, and an oppositely-disposed second surface facing the interior of the device;
a first light source having a top surface and a side surface;
a second light source having a top surface and a side surface;
a light guide comprising a plurality of light areas including a first light area and a second light area, the first light source disposed adjacent to the first light area and the second light source disposed adjacent to the second light area, wherein the light guide comprises a light guide first surface positioned adjacent the keypad second surface, an oppositely-disposed light guide second surface and at least one light guide edge surface connecting the light guide first surface and the light guide second surface, wherein the side surface of the first light source is positioned adjacent to the at least one light guide edge surface, and wherein the side surface of the second light source is positioned adjacent to the at least one light guide edge surface;
and
at least one reflector having stepped portion that facilitates reflection and absorption of light, the at least one reflector comprising a first top flange portion, a second top flange portion, and a bottom flange portion connecting the first top flange portion and the second top flange portion, wherein the bottom flange portion is located between the first surface of the light guide and the second surface of the keypad.

9. The device of claim 8 and further wherein:
the first top flange portion is located between the top surface of the first light source and the second surface of the keypad; and
the second top flange portion is located between the top surface of the second light source and the second surface of the keypad.

10. The device of claim 9 and further wherein:
the first top flange portion comprises a substantially planar first surface;
the bottom flange portion comprises a substantially planar second surface; and
the substantially planar first surface of the first top flange portion is substantially parallel to the substantially planar second surface of the bottom flange portion.

11. The device of claim 10 and further wherein:
the first top flange portion is connected to the bottom flange portion by a first wall portion;
the first wall portion comprises a substantially planar third surface; and
the substantially planar third surface of the first wall portion is transverse to the substantially planar first surface of the first top flange portion and the substantially planar second surface of the bottom flange portion.

12. The device of claim 11 and further wherein:
the substantially planar third surface of the first wall portion is perpendicular to the substantially planar first surface of the first top flange portion and the substantially planar second surface of the bottom flange portion.

13. The device of claim 11 and further wherein:
the second top flange portion is connected to the bottom flange portion by a second wall portion;
the second wall portion comprises a substantially planar fourth surface; and
the substantially planar fourth surface of the second wall portion is transverse to a substantially planar fifth surface of the second top flange portion and the substantially planar second surface of the bottom flange portion.

14. The device of claim 8 and further wherein:
the at least one light guide edge surface defines a distance extending between the light guide first surface and the light guide second surface;
the first light source has a height; and
the height of the first light source is greater than the distance extending between the light guide first surface and the light guide second surface.

15. The device of claim 8 and further wherein:
the first top flange portion has a first surface facing the first light source and an oppositely-disposed second surface facing the keypad;
the first surface of the first top flange portion has a white color; and
the second surface of the first top flange portion has a black color.

16. An electronic device comprising:
a keypad comprising a top surface and a bottom surface;
a light guide comprising a plurality of light areas, and at least one light supply disposed adjacent at least one of the plurality of light areas, wherein the light guide comprising a top surface, a bottom surface, and at least one edge surface connecting the top surface of the light guide and the bottom surface of the light guide, the top surface of the light guide positioned adjacent the bottom surface of the keypad; the light guide further comprising the at least one aperture for receiving the at least one light supply;
the at least one light supply comprising a first light source and a second light source, wherein the first light source comprises a top surface and at least one side surface positioned adjacent to the at least one edge surface of the light guide, and wherein the second light source comprises a top surface and at least one side surface positioned adjacent to the at least one edge surface of the light guide; and
at least one reflector having a stepped portion comprising a first surface and a second surface, the at least one reflector comprising a first reflector end and a second reflector end, wherein the first surface of the at least one reflector is configured to facilitate light reflection and the second surface of the at least one reflector is configured to facilitate light absorption, wherein the first reflector end of the at least one reflector comprises a first top flange portion and a second top flange portion, wherein the first top flange portion is positioned between the top surface of the first light source and the bottom surface of the keypad with the first surface of the at least one reflector facing the top surface of the light source, wherein the second reflector end of the at least one reflector is positioned between the top surface of the light guide and the bottom surface of the keypad with the first surface of the at least one reflector facing the top surface of the light guide, and wherein the second reflector end connects the first top flange portion with the second top flange portion.

17. The electronic device of claim 16, wherein the first surface of the at least one reflector comprises a substantially white color.

18. The electronic device of claim 16, wherein the second surface of the at least one reflector comprises a substantially black color.

19. The electronic device of claim 16, wherein the bottom surface of the keypad comprises beveled indentations corresponding to transparent key button icons on the keypad.

\* \* \* \* \*